United States Patent [19]

Kawaguchi et al.

[11] Patent Number: 4,810,943
[45] Date of Patent: Mar. 7, 1989

[54] METHOD AND APPARATUS FOR CONTROLLING AIR-CONDITIONING APPARATUS

[75] Inventors: Yasutsugu Kawaguchi; Kiyoshi Fuji; Takeshi Mitsuta; Kiyoshi Nagasawa, all of Tochigi, Japan

[73] Assignee: Hitachi, Ltd., Tokyo, Japan

[21] Appl. No.: 888,431

[22] Filed: Jul. 23, 1986

[30] Foreign Application Priority Data

Aug. 7, 1985 [JP] Japan .................. 60-172316

[51] Int. Cl.⁴ .............................................. H02P 7/06
[52] U.S. Cl. ....................................... 318/434; 318/254
[58] Field of Search ............... 318/434, 801, 802, 805, 318/481, 335, 317, 332, 138, 254; 62/DIG. 17; 417/45, 44, 19, 29, 30, 38, 20, 18, 43; 361/30, 31, 22, 23

[56] References Cited

U.S. PATENT DOCUMENTS

| | | | |
|---|---|---|---|
| 3,649,897 | 3/1972 | Messick | 318/434 |
| 3,868,554 | 2/1975 | Konrad | 318/434 |
| 4,179,899 | 12/1979 | Katayama | 361/22 X |
| 4,322,668 | 3/1982 | Trussler | 318/434 |
| 4,528,486 | 7/1985 | Flaig et al. | 318/138 X |
| 4,563,624 | 1/1986 | Yu | 361/22 X |
| 4,574,226 | 3/1986 | Binder | 318/434 X |
| 4,631,458 | 12/1986 | Furuichi | 318/254 |
| 4,653,285 | 3/1987 | Pohl | 361/22 X |
| 4,659,976 | 4/1987 | Johanson | 318/434 X |

FOREIGN PATENT DOCUMENTS 56-93496 11/1981 Japan .

Primary Examiner—Bentsu Ro
Attorney, Agent, or Firm—Antonelli, Terry & Wands

[57] ABSTRACT

In a method and apparatus for controlling an air-conditioning apparatus of a type driving a compressor motor from a DC power source through an inverter, the present current value of a DC input to the inverter is detected, and, when the detected current value is larger than a current limit value, the rotation speed of the compressor motor is decreased by a predetermined value. The current limit is controlled so that it changes linearly relative to the rotation speed of the compressor motor.

3 Claims, 3 Drawing Sheets

METHOD AND APPARATUS FOR CONTROLLING AIR-CONDITIONING APPARATUS

BACKGROUND OF THE INVENTION

This invention relates to a method and apparatus for controlling an overload of an air-conditioning apparatus of a type in which an inverter and a variable-speed motor driving a compressor are provided, and the inverter is controlled to change the rotation speed of the variable-speed motor thereby controlling the heating and cooling capacity of the air-conditioning apparatus. More particularly, this invention relates to a method and apparatus of the kind above described by which such an air-conditioning apparatus is controlled so that the pressure of coolant gas delivered from the compressor may not exceed a predetermined setting under whatever operating condition of the air-conditioning apparatus and regardless of the load and rotation speed of the motor driving the compressor.

The pressure of coolant gas delivered from a compressor of an air-conditioning apparatus tends to exceed a predetermined setting when the air-conditioning apparatus operates under an overloaded condition, and this must be avoided from the viewpoint of the reliability of the piping of the cooling/heating cycle and also from the viewpoint of exhibition of the proper cooling/heating capacity of the air-conditioning apparatus.

A prior art method for controlling an overload of an air-conditioning apparatus is disclosed in, for example, Japanese Patent Application No. JP-A-58-93469 filed by Tokyo Shibaura Electric Co., Ltd. on Nov. 27, 1981. According to the disclosure of the publication cited above, direct current supplied to the input of an inverter part is detected to set a current limit proportional to the duty factor (the ratio of conductive interval to total operating time) of inverter operation, and the air-conditioning apparatus is controlled so that the value of the direct current may not exceed the current limit. The disclosed method has been effective in that motor current supplied to a variable-speed motor driving a compressor can be limited to a value smaller than a fixed value. However, because the relation between the motor current and the pressure of coolant gas delivered from the compressor is not linear, it has not always been possible to control the delivered gas pressure to a value smaller than a fixed value. Let V and I represent the DC voltage and current supplied to the input of the inverter part respectively; N and T represent the rotation speed and torque of the variable-speed motor respectively; v represent the specific volume of the coolant gas when compressed; and $\Delta H$ represent the compression enthalpy difference; following equations are expressed.

Electrical energy supplied to the motor $= V \times I$

Mechanical energy supplied to the compressor $= k_1 \times N \times T$ ($k_1$: a constant)

Thermodynamic energy supplied to the cooling/heating cycle $= k_2 \times N \times \Delta H / v$ ($k_2$: a constant)

Assume herein that the efficiency of energy conversion is 100%. Then, the following relation holds:

$$V \times I = k_1 \times N \times T = k_2 \times N \times \Delta H / v$$

In the above expressions, $\Delta H$ and v include the delivered gas pressure Pd as a variable. Even if the DC voltage V obtained by rectifying a commercial AC voltage may be maintained constant, the delivered gas pressure Pd cannot be controlled by merely controlling the direct current input I, because there is no proportional relation between the direct current input I and the delivered gas pressure Pd.

With a view to overcome the prior art problem, it is a primary object of the present invention to provide a method and apparatus for controlling the rotation speed of the compressor (the motor) so that the delivered gas pressure may not exceed a predetermined setting under an overloaded condition.

SUMMARY OF THE INVENTION

The present invention utilizes the fact that, even when the direct current input is maintained constant, the lower the rotation speed of the compressor, the higher the delivered gas pressure becomes higher. The manner of control according to the present invention is such that the limit of the direct current input to the inverter is changed according to the rotation speed of the compressor, and, when the direct current input exceeds the limit, the rotation speed of the compressor is decreased by a predetermined value, thereby controlling the delivered gas pressure to be equal to or lower than a predetermined setting.

DESCRIPTION OF THE PREFERRED EMBODIMENTS

Figure 1:
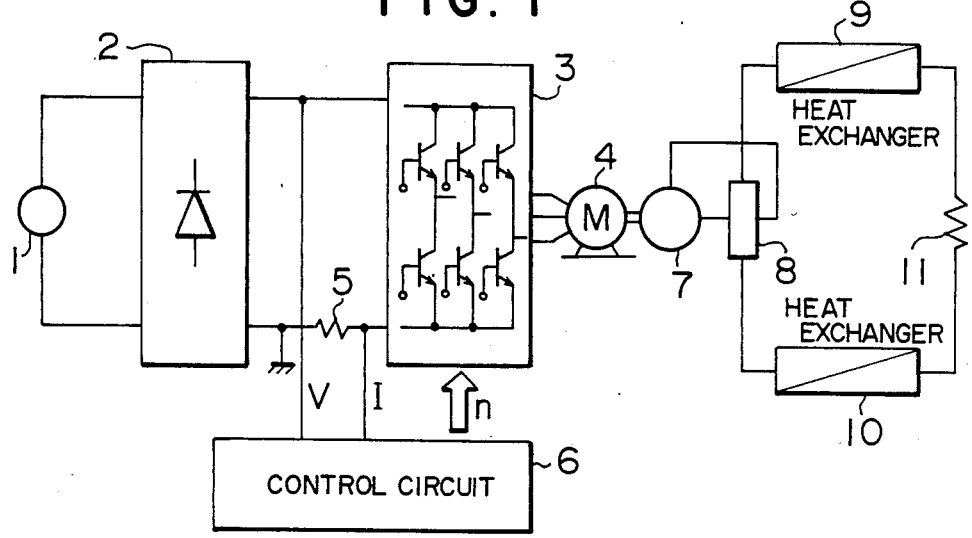
FIG. 1 is an overall system diagram of an air-conditioning apparatus controlled by an embodiment of the method and apparatus according to the present invention.

A preferred embodiment of the present invention will now be described in detail with reference to FIGS. 1, 2, 3 and 4. FIG. 1 is an overall system diagram of an air-conditioning apparatus controlled by an embodiment of the present invention.

Figure 2:
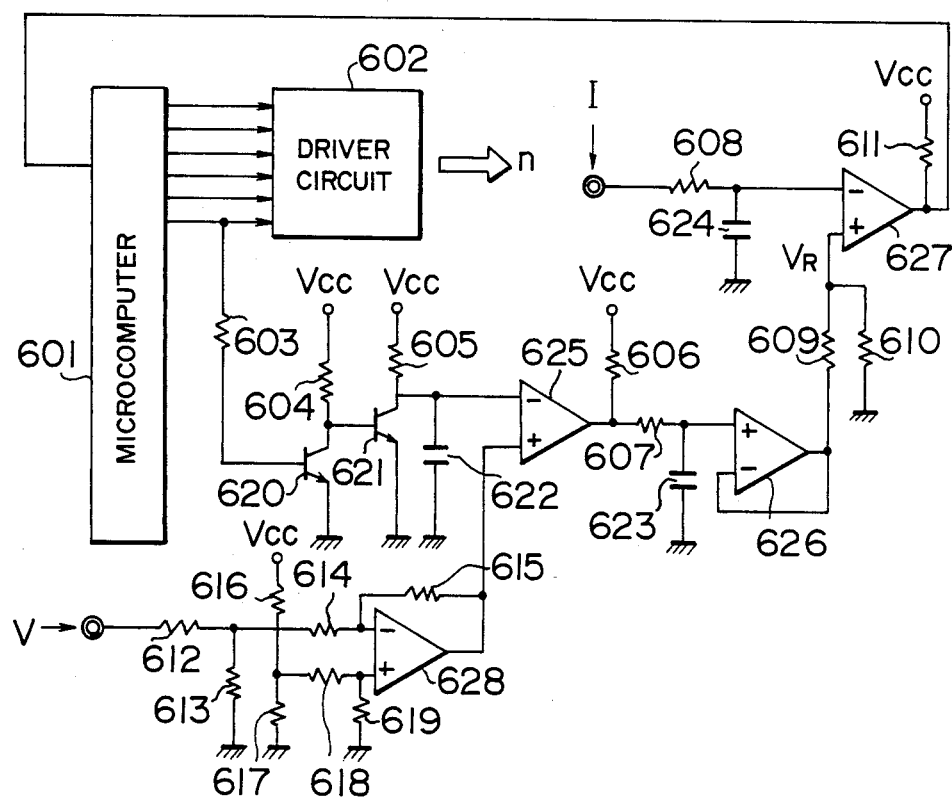
FIG. 2 is a circuit diagram of an overload detection circuit incorporated in the control circuit part shown in FIG. 1.
Figure 3:
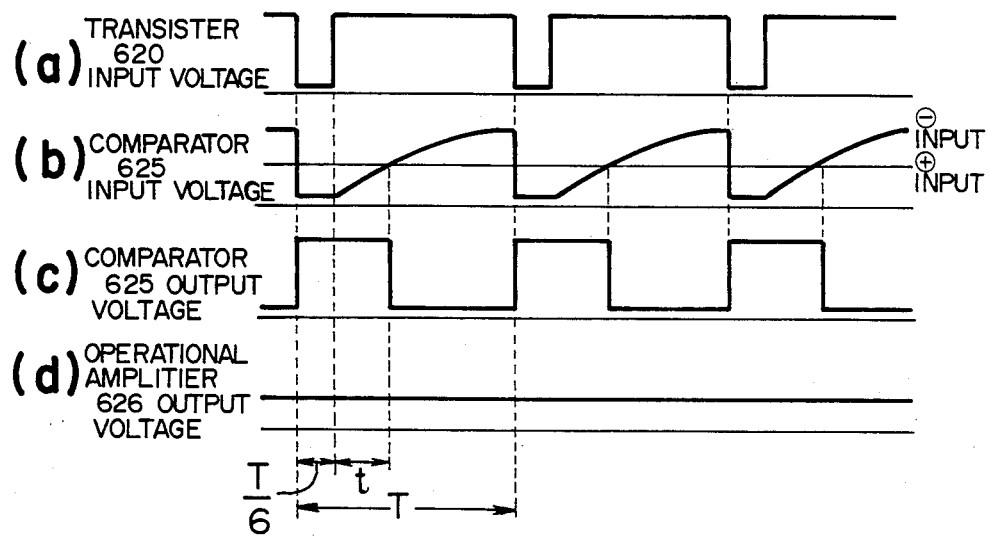
FIG. 3 shows operating voltage waveforms appearing at various parts of the overload detection circuit shown in FIG. 2.

Referring to FIG. 1, an AC voltage supplied from a commercial AC power source 1 is rectified into a DC voltage by a rectifier circuit 2, and the DC voltage V is supplied to an inverter part 3 which is constituted by, for example, six transistors. This inverter part 3 may be a known DC-AC converter constituted by semiconductor switching elements. The DC voltage input V to the inverter part 3 and a direct current input I provided by a voltage drop accross a resistor 5 are also supplied to a control circuit part 6 to be applied to an overload detection circuit incorporated in the control circuit part 6. On the other hand, a drive signal n having a frequency and a duty ratio corresponding to a predetermined rotation speed of a compressor 7 is applied to the inverter part 3 from the control circuit part 6 to switch over the six transistors constituting the inverter part 3. A three-phase AC voltage corresponding to the predetermined rotation speed of the compressor 7 is generated from the inverter part 3 to be supplied to a variable-speed motor 4 driving the compressor 7. Parts disposed on the right-hand side of the compressor 7 in FIG. 1 constitute a system carrying out a cooling/heating cycle. The cooling/heating cycle system includes a four-way valve 8 changing over the flowing direction of a coolant between the cooling cycle and the heating cycle, an indoor heat exchanger 9, an outdoor heat exchanger 10, and a capillary tube 11. This cooling/heating cycle system is well known in the art. FIG. 2 shows the structure of the overload detection circuit incorporated in the control circuit part 6, and FIG. 3 shows operating voltage waveforms appearing at various parts of the overload detection circuits shown in FIG. 2.

The operation of the embodiment of the present invention will be described with reference to FIGS. 2 and 3. A drive signal n indicative of a commanded rotation speed N of the compressor 7 is transmitted by way of a plurality of signal lines from a microcomputer 601 to a driver circuit 602. From one of the signal lines, the signal is derived and applied to a transistor 620 through a resistor 603. As shown in FIG. 3(a), this signal is in the form of a train of negative-logic pulses having a period T and a pulse width T/6. A transistor 621 is in its off state during the period of time in which the signal shown in FIG. 3(a) is in its high level. As a result, a capacitor 622 is charged from Vcc through a resistor 605 to provide a voltage of sawtooth waveform as shown in FIG. 3(b), and such a voltage is applied to a minus input terminal of a first comparator 625. On the other hand, a fixed reference voltage is provided by dividing Vcc by resistors 616 and 617 to be applied to one of input terminals of a first operational amplifier 628, and the inverter-input DC voltage V is applied through a resistor 612 to the other input terminal of the operational amplifier 628. The difference voltage appearing at the output terminal of the operational amplifier 628 is applied, as a reference level, to a plus input terminal of the comparator 625. The resultant output voltage appearing from the comparator 625 is in the form of a train of positive-logic pulses having a period T and a pulse width (T/6+t), as shown in FIG. 3(c). This pulse train output of the comparator 625 is averaged by a resistor 607 and a capacitor 623 to be turned into a DC signal, and this DC signal is applied through a second operational amplifier 626 provided for impedance transformation purpose to a plus input terminal of a second comparator 627 as a limit $V_R$ of the inverter-input direct current I. On the other hand, the voltage representative of the inverter-input direct current I is applied to a minus input terminal of the comparator 627 after being averaged by a resistor 608 and a capacitor 624. When the temperature of external air or the room temperature rises during operation of the compressor 7 rotating at the commanded rotation speed, and the load torque of the motor 4 increases until finally the inverter-input direct current I exceeds the limit $V_R$, the output of the comparator 627 turns into its low level. This low-level signal is applied to the microcomputer 601 as an overload indication signal.

The current limit $V_R$ is expressed as follows:

$$V_R = \frac{R_{610}}{R_{609} + R_{610}} \times Vcc \times \frac{\frac{T}{6} + t}{T} \quad (1)$$

The motor 4 shown in FIG. 1 is a four-pole motor. Therefore, the period of the drive signal n is expressed as a function of the rotation speed N of the compressor 7, as follows:

$$T = \frac{60}{N} \times \frac{1}{2} = \frac{30}{N} \quad (2)$$

From the equations (1) and (2) the current limit $V_R$ is expressed as follows:

$$V_R = \frac{R_{610}}{R_{609} + R_{610}} \times Vcc \times \left(\frac{1}{6} + \frac{N}{30} \times t\right) \quad (3)$$

where $R_{609}$ and $R_{610}$ are resistance values of resistors 609 and 610 respectively. Since t is a constant value of the circuit time constant determined by the combination of the resistor 605 and the capacitor 622, the limit $V_R$ of the direct current I is expressed as a linear equation of the compressor rotation speed N. That is, this current limit $V_R$ changes linearly relative to the compressor rotation speed N.

Figure 5:
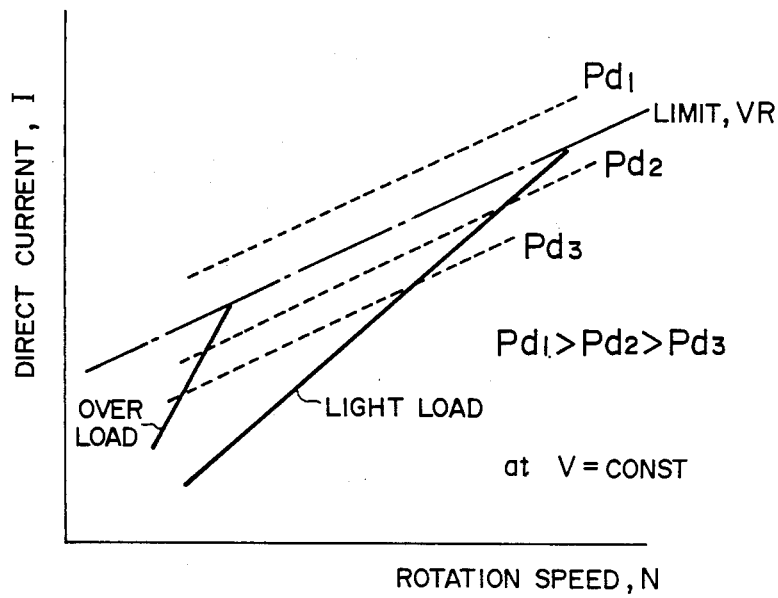
FIG. 5 is a graph showing the relation between the direct current input to the inverter part and the rotation speed of the compressor shown in FIG. 1.

In response to the application of the overload indication signal, the microcomputer 601 generates and applies a modified drive signal n to the driver circuit 602 so that the rotation speed N of the compressor 7 decreases at a rate of 150 rpm during a period of time of 2 sec. This rotation speed control is carried out according to a control program whose flow chart is shown in FIG. 5. The microcomputer 601 may be a known one.

The comparator 628 has a peripheral circuit which corrects the value of the current limit $V_R$ depending on the level of the DC voltage. As described already, the electrical energy Ee applied to the motor 4 is given by Ee = V × I Suppose that the operating conditions (the compressor rotation speed, operating temperature, etc.) of the cooling/heating cycle are kept unchanged. Then, because Ee = constant in such a case, a variation of the commercial AC voltage supplied from the AC power source 1 will cause a corresponding variation of the inverter-input DC voltage V. When the inverter-input DC voltage V increases, the direct current I will decrease to a value smaller than the current limit $V_R$, resulting in impossibility of limiting the gas pressure delivered from the compressor 7. Therefore, it is necessary to correct the value of the current limit $V_R$ too when the DC voltage V varies. For the purpose of the correction, the reference voltage (corresponding to the rated voltage) obtained by voltage division by the resistors 616 and 617 is applied together with the actual DC voltage V to the comparator 628 to find the voltage difference therebetween, and this voltage difference signal is applied to the plus input terminal of the comparator 625. Thus, the input voltage applied to the plus input terminal of the comparator 625 can be changed in proportional relation to the value of 1/V.

Figure 4:
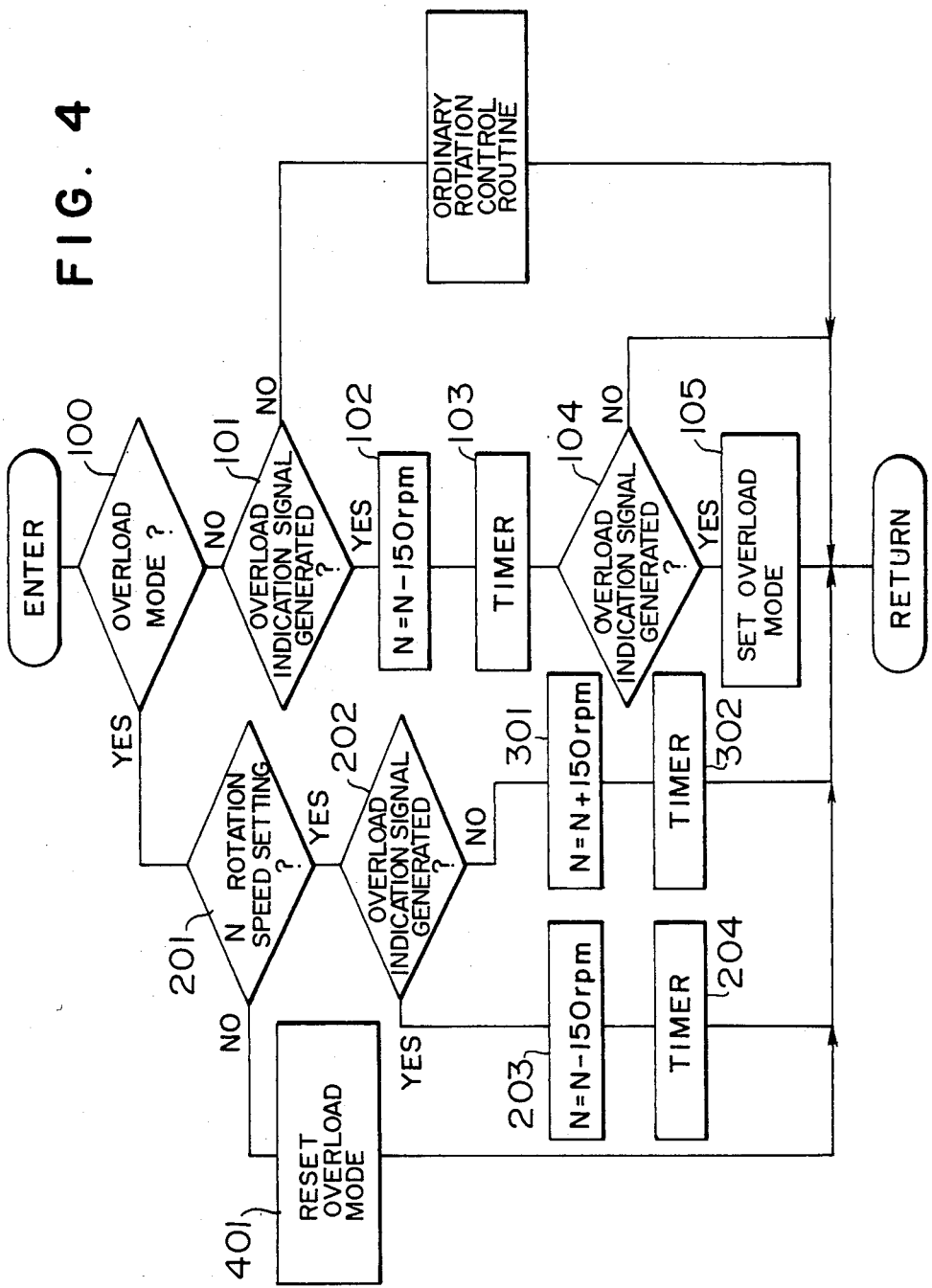
FIG. 4 is a flow chart showing a control program stored in the microcomputer for carrying out the overload preventive control.

The flow chart of the overload control program will now be described with reference to FIG. 4. First, in step 100, judgment is made as to whether or not an overload control mode has occurred. When the result of judgment proves that an overload mode has not occurred, the presence or absence of an overload indication signal (a low-level output from the comparator 627) is checked in step 101. When the overload indication signal is not present, the program proceeds to an ordinary rotation speed control routine. This routine is the same as that commonly employed in a conventional inverter control program, and any detailed description thereof is unnecessary. On the other hand, when the overload indication signal is present, a drive signal for decreasing the compressor rotation speed N at a rate of 150 rpm during a period of time of 2 sec is generated in step 102. After standing by for 2 sec in that state in step 103, the presence or absence of the overload indication signal is checked again in step 104. When the overload indication signal is still present, an overload flag is set in step 105, and the program returns to the step 100. On the other hand, when the overload indication signal disappears as a result of the deceleration of the compressor by 150 rpm, the step 105 is skipped, and the program returns to the step 100.

On the other hand, when the result of judgment in the step 100 proves that the overload mode has occurred (by checking the overload mode flag), whether the present compressor rotation speed N is less than or equal to the rotation speed setting is checked in step 201. When the present compressor rotation speed N is less than or equal to the rotation speed setting, the presence or absence of the overload indication signal is checked in step 202. The presence of the overload indication signal indicates that the value of the direct current I is still larger than the value of the limit $V_R$. In such a case, the drive signal n for decreasing the compressor rotation speed at the rate of 150 rpm during a period of time of 2 sec is generated again in step 203. After standing by for 2 sec in that state in step 204, the program returns to the step 100. The loop described above is repeated until the overload indication signal disappears. When the result of judgment in step 202 proves the disappearance of the overload indication signal, the program proceeds to step 301. Due to the step of deceleration, the compressor rotation speed N is now lower than the setting. Therefore, in the step 301, a drive signal n for increasing the compressor rotation speed N by 150 rpm is generated. After standing by for a predetermined period of time in that state in step 302, the program returns to the step 100. Then, when the compressor rotation speed N exceeds the setting, the overload mode flag is reset in step 401.

FIG. 5 is a graph showing the results of current control according to the present invention. In this graph, the horizontal axis represents the compressor rotation speed N, and the vertical axis represents the direct current I. Two solid curves represent the relation between N and I under an overloaded condition (operation at high ambient temperatures) and a light-loaded condition (operation at low ambient temperatures) respectively. Broken curves are constant gas pressure lines representing the relation between N and I at three pressure values $P_{d1}$, $P_{d2}$ and $P_{d3}$ respectively. A one-dot chain curve represents the current limit $V_R$. It can be seen that the current limit $V_R$ changes linearly relative to the compressor rotation speed N. The air-conditioning apparatus operates in a region lower than the $V_R$ curve. In FIG. 5, it is supposed that the DC voltage V is constant.

It will be seen from FIG. 5 that the curve representing the current limit $V_R$ is substantially parallel to the constant pressure lines, and this means that the delivered gas pressure Pd is effectively controlled. Therefore, when the external air temperature is low in the case of heating operation, the air-conditioning apparatus operates under a light-loaded condition, and the compressor rotation speed N can be increased. That is, the heating capacity can be fully exhibited. On the contrary, when the external air temperature becomes high, the air-conditioning apparatus operates under an overloaded condition, and the compressor rotation speed is kept at a low value, so that the burden on the compressor and piping can be lightened.

In the foregoing description of the embodiment of the present invention, the compressor rotation speed is decreased at a rate of 150 rpm during a period of 2 sec under an overloaded condition. However, the present invention is in no way limited to the deceleration rate specified above, and various values can be employed as required. Further, it is apparent that the inverter is in no way limited to the type composed by transistors, and an inverter composed by semiconductor switching elements such as thyristors can be equally effectively employed.

We claim:

1. A method of controlling an air-conditioning apparatus of a type driving a compressor motor from a DC power source through an inverter, comprising the steps of:

detecting the present current value of a DC input to said inverter;

generating an input current limit corresponding to a rotation speed of said compressor motor;

comparing the present current value of the DC input to said inverter with said input current limit and generating an overload indication signal when the present current value of the DC input to said inverter is larger than said input current limit; and controlling an inverter drive signal upon appearance of said overload indication signal thereby changing the rotation speed of said compressor motor until the present current value of the DC input to said inverter becomes smaller than said input current limit; and wherein, in the step of generating said input current limit, said limit is set at a value given by a linear equation of said motor rotation speed.

2. A method of controlling an air-conditioning apparatus of a type driving a compressor motor from a DC power source through an inverter, comprising the steps of:

detecting the present current value of a DC input to said inverter;

generating an input current limit corresponding to a rotation speed of said compressor motor;

comparing the present current value of the DC input to said inverter with said input current limit and generating an overload indication signal when the present current value of the DC input to said inverter is larger than said input current limit; and controlling an inverter drive signal upon appearance of said overload indication signal thereby changing the rotation speed of said compressor motor until the present current value of the DC input to said inverter becomes smaller than said input current limit and wherein the step of generating said input current limit further includes a step of changing said limit in inversely proportional relation to the voltage value of the DC input to said inverter.

3. An apparatus for controlling an air-conditioning apparatus of a type driving a compressor motor from a DC power source through an inverter, comprising:

inverter driving means for controlling the output of said inverter by a drive signal corresponding to a command value commanding the rotation speed of said compressor motor;

means for detecting the present current value of a DC input to said inverter;

means for generating an input current limit value corresponding to a rotation speed of said compressor motor;

means for comparing said present current value with said input current limit value and generating an overload indication signal when said present current value is larger than said input current limit value; and means for controlling an inverter drive signal upon appearance of said overload indication signal regardless of said speed command value thereby changing the rotation speed of said compressor motor until said present current value becomes smaller than said input current limit value, and wherein said means for generating said overload indication signal further includes means for changing said input current limit value in inversely proportional relation to a variation of the voltage value of the DC input to said inverter.

* * * * *